(No Model.)
G. H. HANSON.
BELT TIGHTENER.
No. 516,927.
Patented Mar. 20, 1894.
Fig: 1.
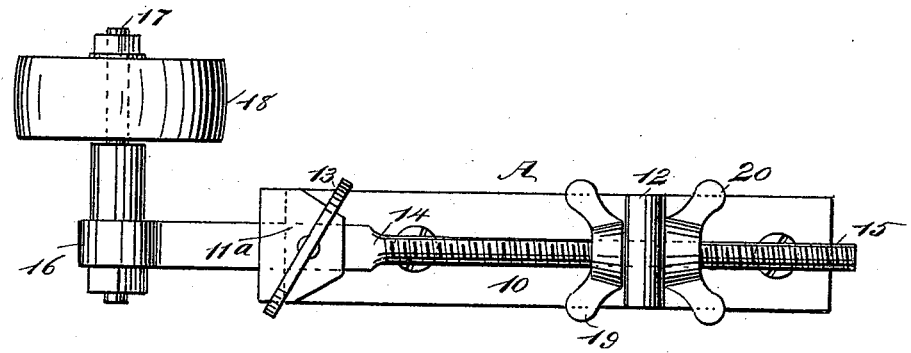
Fig: 2.
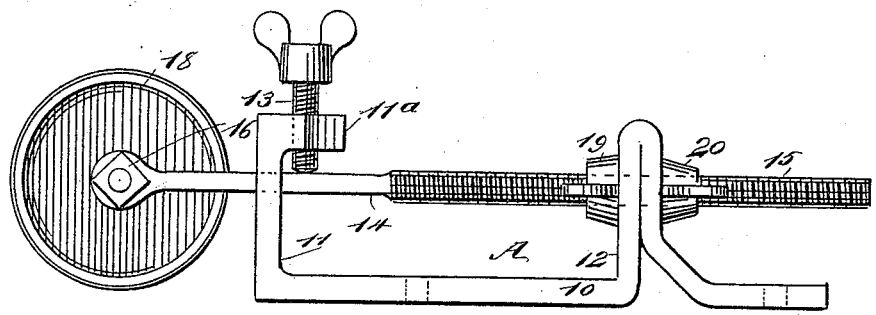
WITNESSES:
Chas. Nida.
C. Sedgwick
INVENTOR
G. H. Hanson
BY
Munn & Co
ATTORNEYS
THE NATIONAL LITHOGRAPHING COMPANY,
WASHINGTON, D. C.

UNITED STATES PATENT OFFICE.

GEORGE H. HANSON, OF ELLSWORTH, IOWA.

BELT-TIGHTENER.

SPECIFICATION forming part of Letters Patent No. 516,927, dated March 20, 1894.

Application filed November 28, 1893. Serial No. 492,204. (No model.)

*To all whom it may concern:*

Be it known that I, GEORGE H. HANSON, of Ellsworth, in the county of Hamilton and State of Iowa, have invented a new and Improved Belt-Tightener, of which the following is a full, clear, and exact description.

My invention relates to a belt tightener, and it has for its object to provide a device capable of being applied in any position required, and which may be operated either toward or from the belt, and adjusted in an expeditious and convenient manner.

A further object of the invention is to locate the tightening pulley at one side of and beyond the adjusting mechanism, so that the tightening pulley may be applied to either the outer or the inner face of the belt as may be found most advantageous.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in both the views.

Figure 1 is a plan view of the tightener; and Fig. 2 is a side elevation of the same.

In carrying out the invention the frame or body A, is provided, which preferably consists of a base plate 10, and two standards 11 and 12 projected upward from the base plate a suitable distance apart. One of the standards, the standard 11, for example, is provided with a head 11ª, and in said head a set screw 13, is fitted. Both of the standards 11 and 12, are provided with aligning apertures and an adjusting bar 14 is passed through the openings in both of the standards. One end of the adjusting bar is provided with a thread 15, while the other end is provided with a socket 16, and that portion of the bar which passes through the standard 11, is preferably provided with a flattened upper face, as that face is to be engaged by the set screw 13, the set screw serving to hold the bar in whatever position it may be placed. An axle 17, is securely fitted in the socket of the adjusting bar 14, and the said axle stands at right angles to the adjusting bar, and is of sufficient length to extend outward some distance beyond the plane of the side surfaces of the standards; and a tightening pulley 18, is held to turn upon the outer end of the said axle, the inner edge of the pulley being out of the plane of the sides of the base and the standards. Two lock nuts 19 and 20, are located upon the threaded portion of the adjusting bar, one at each side of the standard 12; and the pulley is adjusted toward or from the belt, or adjusted to exert more or less tension upon the belt to which it is applied, by loosening the set screw 13, and carrying one or the other of the lock nuts away from the standard 12, to provide for pushing the pulley outward or for drawing it inward, as occasion may demand. When the proper adjustment of the pulley has been obtained, both lock nuts are made to engage with the standard 12, and the set screw is made to have firm bearing on the adjusting bar 14. By reason of the location of the pulley 18 with reference to the body of the belt tightener, it is evident that the tightener may be applied to the under surface of a support as well as to the upper surface, and that the tightener may be placed at any desired angle to a support; and furthermore that the tightening pulley may be as effectively used in engagement with the inner face of the belt as in engagement with the outer face. Furthermore, the device is exceedingly simple, durable and economic in its construction.

Having thus described my invention, I claim as new and desire to secure by Letters Patent—

1. In a belt tightener, the combination, with a support, an adjusting bar having slidable movement in the support, and provided with a screw-threaded portion at one of its ends, of lock-nuts carried by the adjusting bar to engage each side of the support, and a tightening pulley carried by the other end of the said bar at the side thereof, substantially as described.

2. In a belt tightener, the combination, with a base, standards located upon the base, and an adjusting bar having slidable movement in the standards, a portion of the said bar being threaded, of lock nuts carried by the adjusting bar and adapted for engagement with one of the standards, an adjusting screw carried by one of the standards and adapted for engagement with the adjusting bar, an axle attached to the outer end of the adjusting bar and located at an angle thereto, and a tightening pulley held to revolve upon the axle and located beyond the plane of one side surface of the base and standards, substantially as shown and described, whereby the adjusting bar may be given end movement in either direction, and the pulley may be applied to the inner or to the outer surface of the belt, as and for the purpose specified.

GEORGE H. HANSON.

Witnesses:
G. W. MILLER,
M. H. BRINTON.